United States Patent
Lee et al.

(10) Patent No.: US 11,563,206 B2
(45) Date of Patent: Jan. 24, 2023

(54) LITHIUM SECONDARY BATTERY

(71) Applicant: SK INNOVATION CO., LTD., Seoul (KR)

(72) Inventors: Jong Hyuk Lee, Daejeon (KR); Dock Young Yoon, Daejeon (KR); Hee Gyoung Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/703,666

(22) Filed: Mar. 24, 2022

(65) Prior Publication Data

US 2022/0216458 A1    Jul. 7, 2022

Related U.S. Application Data

(63) Continuation of application No. 16/791,222, filed on Feb. 14, 2020, now Pat. No. 11,322,735.

(30) Foreign Application Priority Data

Feb. 15, 2019 (KR) ........................ 10-2019-0018050

(51) Int. Cl.
*H01M 4/133* (2010.01)
*H01M 4/583* (2010.01)
*H01M 10/0525* (2010.01)
*H01M 4/02* (2006.01)

(52) U.S. Cl.
CPC .......... *H01M 4/133* (2013.01); *H01M 4/583* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2013/0143127 A1 *    6/2013    Nakamura ............ H01M 4/366
                                                                    429/231.8

* cited by examiner

*Primary Examiner* — Wyatt P McConnell
(74) *Attorney, Agent, or Firm* — IP & T Group LLP

(57) ABSTRACT

Provided is a lithium secondary battery. The lithium secondary battery includes a negative electrode including a negative electrode active material layer, wherein the negative electrode active material layer includes a mixed negative electrode active material including graphite particles and low crystalline carbon-based particles, and the negative electrode active material layer has an apex of an exothermic peak in a temperature range of no less than 370° C. and no more than 390° C., as measured by differential scanning calorimetry (DSC).

13 Claims, 3 Drawing Sheets

FIG. 3
MICROSCOPE IMAGE
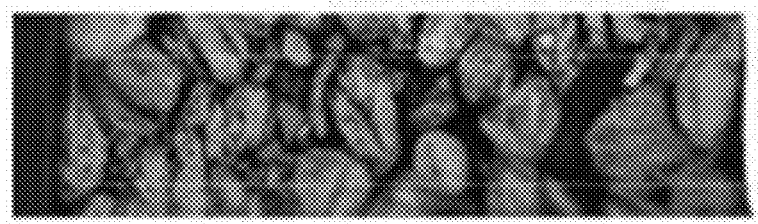
HARD CARBON
RAMAN IMAGE
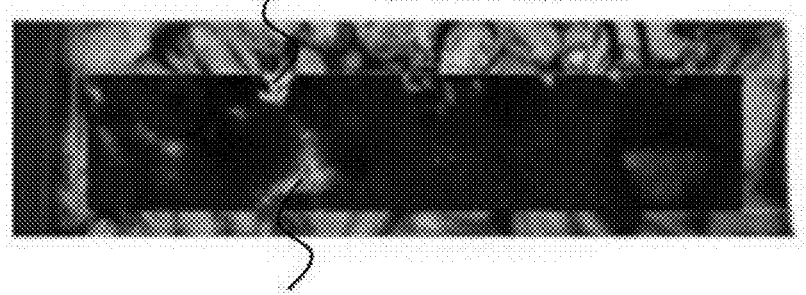
HARD CARBON
FIG. 4

LITHIUM SECONDARY BATTERY

CROSS-REFERENCE TO RELATED APPLICATIONS

This application is a continuation of U.S. patent application Ser. No. 16/791,222 filed on Feb. 14, 2020, which claims benefits of priority of Korean Patent Application No. 10-2019-0018050 filed on Feb. 15, 2019. The disclosure of each of the foregoing application is incorporated herein by reference in its entirety.

TECHNICAL FIELD

The following disclosure relates to a lithium secondary battery.

BACKGROUND

In recent years, ardent research on high-capacity batteries has been conducted to increase a driving range in order to commercialize electric vehicles.

Because graphite commonly used as a negative electrode active material for lithium secondary batteries has a low theoretical capacity, it has limitations in increasing the driving range. Therefore, active attempts have been made to apply a new high-capacity negative electrode active material as a Si-based negative electrode active material, and the like.

However, this research is still insufficient to commercialize the electric vehicles, and requires a lot of time until the electric vehicles are commercialized.

Therefore, as another plan, an approach of directing the improvement of a charge/discharge rate instead of an increase in the driving range may be considered in order to advance the commercialization of the electric vehicles.

To improve the charge/discharge rate, lithium ions have to be adsorbed and released to/from a negative electrode of a lithium secondary battery at a high speed. In this case, graphite has a problem in that it is difficult to realize high-current input characteristics, which makes it difficult to rapidly charge and discharge the lithium secondary battery.

Also, it is essential to prevent degradation of the battery under a high-temperature environment and secure the long-term lifespan performance in terms of the reliability of electric cars.

Accordingly, there is a need for the development of a new negative electrode and lithium secondary battery having excellent battery characteristics such as high-temperature storage efficiency and lifespan characteristics, and the like while realizing the high-current input characteristics so that the lithium secondary battery can be rapidly charged and discharged.

SUMMARY

An embodiment of the present invention is directed to providing a lithium secondary battery capable of realizing excellent high-temperature storage efficiency and lifespan characteristics while realizing high-current input characteristics so that the lithium secondary battery can be rapidly charged and discharged.

In one general aspect, a lithium secondary battery includes a negative electrode including a negative electrode active material layer, wherein the negative electrode active material layer includes a mixed negative electrode active material including graphite particles and low crystalline carbon-based particles, and the negative electrode active material layer has an apex of an exothermic peak in a temperature range of no less than 370° C. and no more than 390° C., as measured by differential scanning calorimetry (DSC).

The differential scanning calorimetry measurement is performed by heating 6 mg of a specimen of the negative electrode active material layer to 600° C. at a rate of 5° C./min while feeding air to the specimen at a rate of 50 mL/min.

The low crystalline carbon-based particles may have a Raman spectrum R value ($I_d/I_g$) of 0.9 or more.

The negative electrode active material layer may further have an apex of an exothermic peak in a temperature range of no less than 450° C. and no more than 510° C., as measured by differential scanning calorimetry (DSC).

A heating value of the exothermic peak having an apex at a temperature of no less than 370° C. and no more than 390° C. may be no less than 50 J/g and no more than 200 J/g.

A heating value of the exothermic peak having an apex at a temperature of no less than 450° C. and no more than 510° C. may be no less than 20 J/g and no more than 60 J/g.

The low crystalline carbon-based particles may be capable of adsorbing and releasing Li ions.

The low crystalline carbon-based particles may have a discharge capacity of 240 mAh/g or more for the second cycle when the negative electrode active material is used as the low crystalline carbon-based particles and a lithium metal is used as a counter electrode.

The discharge capacity is a discharge capacity determined under charging/discharging conditions at which, after charging is performed with a constant current at a rate of 0.1 C, the charging is stopped when a current flows at a rate of 0.01 C in a constant voltage mode until a constant voltage reaches 0.005 V, and discharging to 1.5V is performed with a constant current at a rate of 0.1 C with a rest interval of 10 minutes.

The low crystalline carbon-based particles may be hard carbon particles.

The low crystalline carbon-based particles may have a $D_v50$ of 4 μm or less and a $D_n50$ of 1 μm or less.

The $D_v50$ represents a particle diameter when a cumulative volume from a small particle diameter accounts for 50% in measuring a particle size distribution using a laser scattering method, and the $D_n50$ represents a particle diameter when a cumulative particle number from a small particle diameter accounts for 50% in measuring a particle size distribution using a laser scattering method.

The low crystalline carbon-based particles may have a $D_v10$ of 2 μm or less and a $D_n10$ of 0.5 μm or less.

The $D_v10$ represents a particle diameter when a cumulative volume from a small particle diameter accounts for 10% in measuring a particle size distribution using a laser scattering method, and the $D_n10$ represents a particle diameter when a cumulative particle number from a small particle diameter accounts for 10% in measuring a particle size distribution using a laser scattering method.

The low crystalline carbon-based particles may have a $D_v90$ of 8 μm or less and a $D_n90$ of 2.7 μm or less.

The $D_v90$ represents a particle diameter when a cumulative volume from a small particle diameter accounts for 90% in measuring a particle size distribution using a laser scattering method, and the $D_n90$ represents a particle diameter when a cumulative particle number from a small particle diameter accounts for 90% in measuring a particle size distribution using a laser scattering method.

The mixed negative electrode active material may include 5% by weight or less of the low crystalline carbon-based particles, based on a total of 100% by weight of the mixed negative electrode active material.

The negative electrode may have a total pore area of 3.0 m²/g or less, as measured by mercury intrusion porosimetry when the negative electrode is pressed at an electrode density of 1.6 g/cc.

A rate of increase (A) in the total pore area of the negative electrode may be less than or equal to 3.4.

$$A=(V_a-V_b)/0.2$$

wherein $V_a$ represents a total pore area (m²/g) of the negative electrode measured at an electrode density of 1.7 g/cc by mercury intrusion porosimetry, $V_b$ represents a total pore area (m²/g) of the negative electrode measured at an electrode density of 1.5 g/cc by mercury intrusion porosimetry, and 0.2 is calculated from the equation: 1.7 g/cc−1.5 g/cc.

In another general aspect, a lithium secondary battery includes a negative electrode including a negative electrode active material layer, wherein the negative electrode active material layer includes a mixed negative electrode active material including graphite particles and low crystalline carbon-based particles, and, in three or more points having an area of 80 μm×20 μm optionally selected from sections of the negative electrode active material layer, an area of the low crystalline carbon-based particles accounts for no less than 0.5% and no more than 8% with respect to the total area of the sections.

In the three or more points having an area of 80 μm×20 μm optionally selected from sections of the negative electrode active material layer, the area of the low crystalline carbon-based particles having a long diameter of 8 μm or less may account for no less than 0.5% and no more than 8% with respect to the total area of the sections.

In the three or more points having an area of 80 μm×20 μm optionally selected from sections of the negative electrode active material layer, a ratio of a diameter of the low crystalline carbon-based particles to a diameter of the graphite particles may be less than or equal to ½.

The diameter of the graphite particles and the diameter of the low crystalline carbon-based particles are the highest value selected from the long diameters of the graphite particles and the highest value selected from the long diameters of the low crystalline carbon-based particles, respectively, in the optionally selected points having an area of 80 μm×20 μm.

The low crystalline carbon-based particles may have a Raman spectrum R value ($I_d/I_g$) of 0.9 or more.

BRIEF DESCRIPTION OF THE DRAWINGS

FIG. 3 shows a section scanning electron microscope image and a Raman image of a certain point in a negative electrode active material layer of a negative electrode prepared according to one exemplary embodiment of the present invention.

FIG. 4 shows the differential scanning calorimetry (DSC) results of measuring the negative electrode active material layer of the negative electrode prepared according to one exemplary embodiment of the present invention.

DETAILED DESCRIPTION OF EMBODIMENTS

Figure 1:
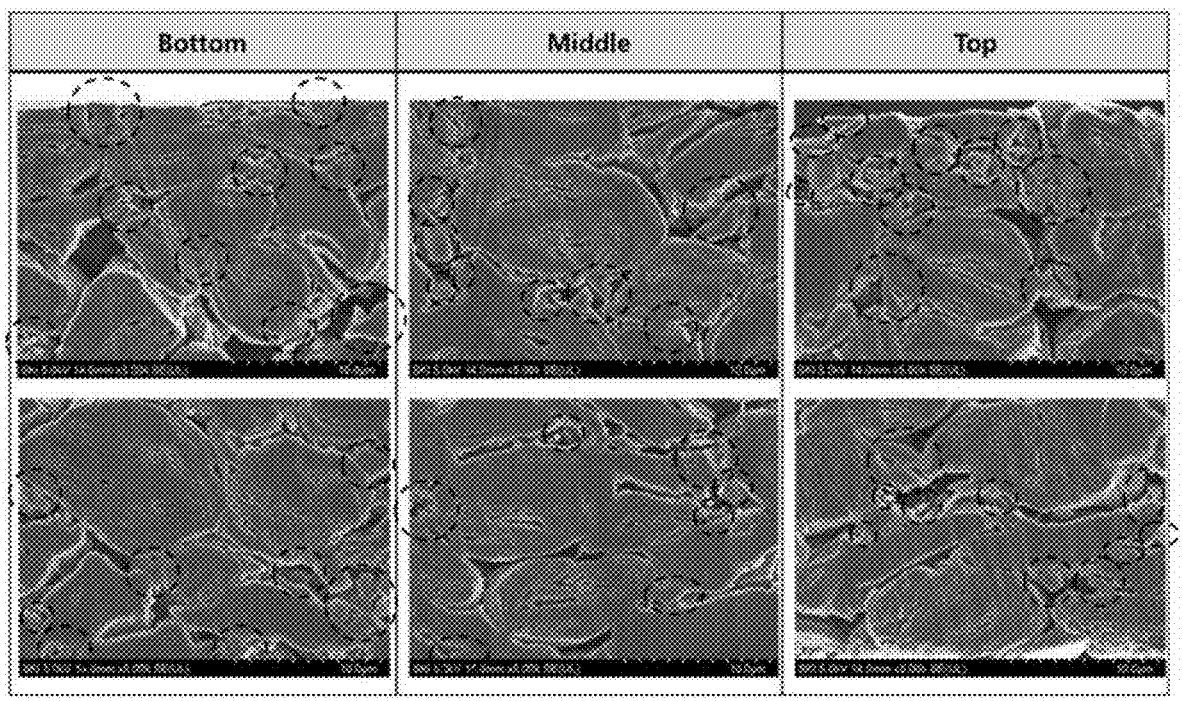
FIG. 1 is a scanning electron microscope (SEM) image obtained by observing a section of a negative electrode prepared in Example 3.

All terms (including technical and scientific terms) used in the present specification may be used as a meaning which is commonly understood by those skilled in the art to which the present invention pertains, unless otherwise defined. Throughout the present specification, unless explicitly described to the contrary, "comprising" any components will be understood to imply the further inclusion of other elements rather than the exclusion of any other elements. Unless explicitly described to the contrary, a singular form also includes a plural form.

One exemplary embodiment of the present invention provides a lithium secondary battery that may be rapidly charged and discharged because the lithium secondary battery may rapidly adsorb and release lithium ions to/from a negative electrode, has excellent high-temperature storage efficiency because the capacity of the lithium secondary battery is slightly degraded even when kept at a high temperature of 60° C., and has excellent lifespan characteristics because the capacity of the lithium secondary battery is slightly degraded even when repeatedly charged and discharged.

For this purpose, it is expected that the lithium secondary battery may be chosen as a lithium secondary battery for electric vehicles, thereby significantly advancing a time for commercialization of electric vehicles.

Also, the lithium secondary battery may have further improved lifespan characteristics because the lithium secondary battery has an excellent ability to adsorb and release lithium ions, and also shows a few side reactions with an electrolyte solution of the negative electrode.

The lithium secondary battery according to one exemplary embodiment of the present invention may have excellent battery output characteristics such as charge and discharge outputs, and rapid charging and discharging.

Further, the lithium secondary battery according to one exemplary embodiment of the present invention may have excellent lifespan and high-temperature storage characteristics.

Specifically, one exemplary embodiment of the present invention provides a lithium secondary battery, which includes a negative electrode having a negative electrode active material layer, which includes a mixed negative electrode active material including graphite particles and low crystalline carbon-based particles, wherein, in three or more points having an area of 80 μm×20 μm area optionally selected from sections of the negative electrode active material layer of the negative electrode, an area of the low crystalline carbon-based particles accounts for no less than 0.5% and no more than 8% with respect to the total area of the sections.

In the lithium secondary battery according to one exemplary embodiment of the present invention, when the area of the low crystalline carbon-based particles in the sections of the negative electrode active material layer satisfies this range, output characteristics, high-temperature storage efficiency, and lifespan characteristics of the lithium secondary battery may be improved without any decrease in energy density by the addition of the low crystalline carbon-based particles.

More specifically, in the three or more points having an area of 80 μm×20 μm area optionally selected from the sections of the negative electrode active material layer, an area of the low crystalline carbon-based particles having a long diameter of 8 μm or less may account for no less than 0.5% and no more than 8% with respect to the total area of the sections.

When the area of the low crystalline carbon-based particles satisfies this range, output characteristics, high-temperature storage efficiency, and lifespan characteristics of the lithium secondary battery may also be improved without any decrease in energy density by the addition of the low crystalline carbon-based particles.

The low crystalline carbon-based particles may have a Raman spectrum R value ($I_d/I_g$) of 0.9 or more.

The R value of the low crystalline carbon-based particles refers to a ratio ($I_d/I_g$) between an intensity ($I_d$) of a D band and an intensity ($I_g$) of a G band in the Raman spectrum for the sections of the low crystalline carbon-based particles.

The intensity ($I_g$) of the G band refers to a peak intensity in a wavenumber domain of no less than 1,540 $cm^{-1}$ and no more than 1,620 $cm^{-1}$, and the intensity ($I_d$) of the D band refers to a peak intensity in a wavenumber domain of no less than 1,300 $cm^{-1}$ and no more than 1,420 $cm^{-1}$.

Also, because the R value of the graphite particles is less than or equal to 0.7, the graphite particles and the low crystalline carbon-based particles may be distinguished in the Raman analysis.

The area of the low crystalline carbon-based particles in the sections may be measured as an area of a region having an R value of 0.9 or more, as measured in the optionally selected points having an area of 80 μm×20 μm by the Raman analysis as described above.

The area of the low crystalline carbon-based particles having a long diameter of 8 μm or less may be measured as an area of the region having a long diameter of 8 μm or less in the region having an R value of 0.9 or more, as measured in the optionally selected points having an area of 80 μm×20 μm by the Raman analysis as described above.

Also, in this specification, the term "long diameter" refers to the largest length in a length of a line connecting two points on an edge of a closed curve-shaped particle section, as determined for the sections of the negative electrode active material layer.

Specifically, the low crystalline carbon-based particles may be confirmed and the area of the low crystalline carbon-based particles may be measured from the data obtained at the points having an R value of 0.9 or more, for example, by cutting a negative electrode active material layer of a negative electrode specimen using an ion miller, processing sections of the negative electrode active material layer, and subjecting the sections to Raman analysis at longitudinal and vertical intervals of 200 nm from any points having an area of 80 μm×20 μm using a Raman analyzer (Nanophoton, RAMANforce) to obtain Raman data for the electrode sections. In this case, the analysis may be performed under conditions of a laser wavelength of 532.06 nm, a laser output of 11.87 mW, and a laser exposure time of 20 seconds using a Raman spectrometer.

In the three or more points having an area of 80 μm×20 μm optionally selected from the sections of the negative electrode active material layer of the negative electrode in the lithium secondary battery according to one exemplary embodiment of the present invention, a ratio of a diameter of the low crystalline carbon-based particles to a diameter of the graphite particles (i.e., a diameter of low crystalline carbon-based particles/a diameter of graphite particles) may be less than or equal to ½.

In the lithium secondary battery according to one exemplary embodiment of the present invention, when the ratio between the diameters of the low crystalline carbon-based particles and the graphite particles in the sections of the negative electrode active material layer satisfies this range, output characteristics, high-temperature storage efficiency, and lifespan characteristics of the lithium secondary battery may be improved without causing any damage to the graphite particles and any decrease in energy density by the addition of the low crystalline carbon-based particles.

Here, the diameter of the graphite particles and the diameter of the low crystalline carbon-based particles are the highest value selected from the long diameters of the graphite particles and the highest value selected from the long diameters of the low crystalline carbon-based particles, respectively, in the optionally selected points having an area of 80 μm×20 μm.

Specifically, the graphite particles may be confirmed with the naked eye from a scanning electron microscope image at any points having the area, and the diameter of the graphite particles may be determined by measuring the highest value selected from the long diameters of the graphite particles thus confirmed.

The low crystalline carbon-based particles may be confirmed from the points having an R value (a ratio $I_d/I_g$ of an intensity ($I_d$) of a D band and an intensity ($I_g$) of a G band in the measured Raman spectrum) of 0.9 or more based on the Raman analysis results of the corresponding specimen as described above, and the diameter of the low crystalline carbon-based particles may be determined by measuring the highest value selected from the long diameters of the low crystalline carbon-based particles thus confirmed.

The ratio of the diameter of the low crystalline carbon-based particles to the diameter of the graphite particles may be illustratively and more specifically less than or equal to ¼. In this case, the lower limit of the ratio may be less than or equal to ¹⁄₁₀.

The lithium secondary battery according to one exemplary embodiment of the present invention may include a negative electrode having a negative electrode active material layer, which includes a mixed negative electrode active material including graphite particles and low crystalline carbon-based particles, wherein the negative electrode active material layer of the negative electrode may have an apex of an exothermic peak in a temperature range of no less than 370° C. and no more than 390° C., as measured by differential scanning calorimetry (DSC).

More specifically, the negative electrode active material layer may have an apex of an exothermic peak in a temperature range of no less than 375° C. and no more than 390° C., or no less than 375° C. and no more than 385° C.

Here, the apex of the exothermic peak also refers to the maximum point of a peak in the corresponding temperature range.

When these physical properties are realized, output characteristics, high-temperature storage efficiency, and lifespan characteristics of the lithium secondary battery may be improved without any decrease in energy density by the addition of the low crystalline carbon-based particles. More specifically, the negative electrode active material layer may have an apex of an exothermic peak in a temperature range of no less than 450° C. and no more than 510° C. Further more specifically, the negative electrode active material layer may have an apex of an exothermic peak in a temperature range of no less than 460° C. and no more than 500° C.

Here, the differential scanning calorimetry measurement may, for example, be performed by heating 6 mg of a specimen of the negative electrode active material layer to 600° C. at a rate of 5° C./min while feeding air to the specimen at a rate of 50 mL/min using differential scanning calorimetry (851e Model from Mettler Toledo Ltd.).

Also, a heating value of the exothermic peak having an apex at a temperature of no less than 370° C. and no more than 390° C. may be no less than 50 J/g and no more than 200 J/g. When the heating value of the exothermic peak satisfies this range, output characteristics, high-temperature storage efficiency, and lifespan characteristics of the lithium secondary battery may be improved without any decrease in energy density by the addition of the low crystalline carbon-based particles.

In addition, a heating value of the exothermic peak having an apex at a temperature of no less than 450° C. and no more than 510° C. may be no less than 20 J/g and no more than 60 J/g. When the heating value of the exothermic peak satisfies this range, output characteristics, high-temperature storage efficiency, and lifespan characteristics of the lithium secondary battery may be improved without any decrease in energy density by the addition of the low crystalline carbon-based particles.

The low crystalline carbon-based particles may have a Raman spectrum R value ($I_d/I_g$) of 0.9 or more.

Meanwhile, upon thermogravimetric analysis (TGA) of the negative electrode in the lithium secondary battery according to one exemplary embodiment of the present invention, the weight loss of the negative electrode at a temperature to 300° C. may be no less than 1% by weight and no more than 2% by weight, the weight loss at a temperature from 300° C. to 450° C. may be no less than 1.5% by weight and no more than 4% by weight, and the weight loss at a temperature from 300° C. to 650° C. may be no less than 35% by weight and no more than 75% by weight, but the present invention is not particularly limited thereto.

Also, in a curve graph obtained by differentiating a weight loss curve for thermogravimetric measurements, peaks may exist in a temperature range of no less than 300° C. and no more than 400° C., and further peaks may exist in a temperature range of no less than 400° C. and no more than 500° C., but the present invention is not particularly limited thereto.

When the weight loss in the thermogravimetric analysis and a peak range on a differential graph for the weight loss curve are satisfied, output characteristics, high-temperature storage efficiency, and lifespan characteristics of the lithium secondary battery may be improved without any decrease in energy density by the addition of the low crystalline carbon-based particles.

In the lithium secondary battery according to one exemplary embodiment of the present invention, the low crystalline carbon-based particles may be capable of adsorbing and releasing Li ions.

Also, the low crystalline carbon-based particles may have a discharge capacity of 240 mAh/g or more for the second cycle when the negative electrode active material is used as the low crystalline carbon-based particles and a lithium metal is used as a counter electrode.

Here, the discharge capacity may be a discharge capacity determined under charging/discharging conditions at which, after charging is performed with a constant current at a rate of 0.1 C, the charging is stopped when a current flows at a rate of 0.01 C in a constant voltage mode until a constant voltage reaches 0.005 V, and discharging to 1.5V is performed with a constant current at a rate of 0.1 C with a rest interval of 10 minutes.

Also, the low crystalline carbon-based particles may be low crystalline carbon-based particles such as hard carbon particles, soft carbon particles, and the like. More specifically, the low crystalline carbon-based particles may be hard carbon particles.

Hereinafter, when it is assumed that the low crystalline carbon-based particles are hard carbon particles, for example, low crystalline carbon-based particles of the present invention and a negative electrode including the same will be described in further detail. However, it should be understood that the low crystalline carbon-based particles of the present invention are not intended to be particularly limited to the hard carbon particles.

In the negative electrode of the lithium secondary battery according to one exemplary embodiment of the present invention, the hard carbon particles may have a $D_v50$ of 4 μm or less and a $D_n50$ of 1 μm or less.

The $D_v50$ represents a particle diameter when a cumulative volume from a small particle diameter accounts for 50% in measuring a particle size distribution using a laser scattering method, and the $D_n50$ represents a particle diameter when a cumulative particle number from a small particle diameter accounts for 50% in measuring a particle size distribution using a laser scattering method.

When the negative electrode of the lithium secondary battery according to one exemplary embodiment of the present invention includes finely divided hard carbon particles, which satisfy the aforementioned particle size distribution, as the negative electrode active material, the finely divided hard carbon particles may be disposed in pores between graphite particles serving as a main active material. Therefore, because a volume of the negative electrode does not increase, a decrease in energy density may not be caused.

At the same time, because a lithium (Li) diffusion path may be reduced, and a pathway of electrons and ions disposed in the pores between the graphite particles may be enlarged due to the inherent characteristics and a finely divided form of hard carbon, it is possible to realize excellent output characteristics, high-temperature storage efficiency, and lifespan characteristics of the lithium secondary battery including the hard carbon.

Also, hard carbon has a sharp end. In this case, because the finely divided hard carbon particles are disposed in the pores between the graphite particles and have a small size of ½ or less with respect to commercially available hard carbon, it is possible to disperse stress and prevent damage to graphite particles in a pressing stage during electrode preparation.

Specifically, the $D_v50$ and $D_n50$ of the hard carbon particles measured by a laser scattering method are less than or equal to 4 μm and less than or equal to 1 μm, respectively, and the count of particles that are generally finely divided and have a particle diameter of 1 μm or less may account for 50% or more so that the hard carbon particles can be more easily disposed in the pores between the graphite particles, thereby realizing the aforementioned effects.

More specifically and illustratively, the $D_v50$ of the hard carbon particles may be less than or equal to 3 μm.

Also, when the negative electrode of the lithium secondary battery according to one exemplary embodiment of the present invention includes finely divided hard carbon particles having a small average particle diameter, the finely divided hard carbon particles may be disposed in the pores between the graphite particles, and thus the number of the finely divided hard carbon particles may increase with respect to the weight thereof when the finely divided hard carbon particles are added at the same weight. Therefore, excellent output characteristics, high-temperature storage efficiency (a high-temperature storage capacity retention rate), and lifespan characteristics of the lithium secondary battery may be realized without any decrease in energy density even when the finely divided hard carbon particles are added at a low content.

That is, a mixture obtained by mixing at least 10% by weight of the hard carbon particles of the present invention having physical properties, which do not satisfy the particle size distribution with the sacrifice of the energy density, with graphite particles has been used in the art to improve the output performance. However, when the negative electrode active material included in the negative electrode of the lithium secondary battery according to one exemplary embodiment of the present invention is mixed with a small amount of the hard carbon particles satisfying a certain particle size distribution, excellent lifespan characteristics, high-temperature storage efficiency, and lifespan characteristics of the lithium secondary battery may be realized without any decrease in energy density.

Here, the $D_v50$ and $D_n50$ of the prepared hard carbon particles may, for example, be measured using Mastersizer 3000 (Malvern Instruments Ltd.) after a specimen of the hard carbon particles is taken according to the KS A ISO 13320-1 standard. Specifically, a volume density and a number density of the hard carbon particles may be measured after the hard carbon particles are dispersed using ethanol as a solvent, and using an ultrasonic disperser, when necessary.

In the negative electrode of the lithium secondary battery according to one exemplary embodiment of the present invention, the mixed negative electrode active material may include 5% by weight or less of the hard carbon particles, based on a total of 100% by weight of the mixed negative electrode active material.

That is, in the negative electrode of the lithium secondary battery according to one exemplary embodiment of the present invention, the mixed negative electrode active material may include 95% by weight or more of the graphite particles and 5% by weight or less of the hard carbon particles, based on a total of 100% by weight of the mixed negative electrode active material.

That is, even when the negative electrode active material according to one exemplary embodiment of the present invention includes a small amount of the finely divided hard carbon particles satisfying this particle size range, it is possible to realize output characteristics, high-temperature storage efficiency, and lifespan characteristics of the lithium secondary battery.

That is, when an amount of the mixed hard carbon particles is less than or equal to 5% by weight, based on a total of 100% by weight of the graphite particles and the hard carbon particles, output characteristics, high-temperature storage efficiency, and lifespan characteristics of the lithium secondary battery may be improved without any decrease in energy density.

Also, because only a small amount of the finely divided hard carbon particles is mixed with respect to the graphite particles, there is no difficulty in preparing a slurry due to an increase in specific surface area of the active material.

More specifically, an amount of the mixed hard carbon particles may be no less than 1% by weight and no more than 5% by weight, no less than 3% by weight and no more than 5% by weight, no less than 2% by weight and no more than 5% by weight, no less than 2% by weight and no more than 4% by weight, or no less than 2% by weight and no more than 3% by weight. In this case, the graphite particles may be included as the balance, but the present invention is not particularly limited thereto.

Also, according to one exemplary embodiment of the present invention, the graphite particles may be natural graphite or artificial graphite, but the present invention is not particularly limited thereto. The graphite particles may have a shape such as a spherical shape, a planar shape, or the like without limitation.

According to one exemplary embodiment of the present invention, the average particle diameter of the graphite particles may also be no less than 6 μm and no more than 20 μm. More specifically, the average particle diameter of the graphite particles may be no less than 8 μm and no more than 17 μm. Within this range, it is desirable that the hard carbon particles according to one exemplary embodiment of the present invention may be disposed in the pores between the graphite particles without causing any damage to the graphite particles.

In the negative electrode active material included in the negative electrode of the lithium secondary battery according to one exemplary embodiment of the present invention, the $D_n50$ of the hard carbon particles may be more specifically less than or equal to 0.6 μm.

Also, the $D_v50$ may be greater than or equal to 1 μm, and the $D_n50$ may be greater than or equal to 0.3 μm, but the present invention is not limited thereto.

In the negative electrode active material included in the negative electrode of the lithium secondary battery according to one exemplary embodiment of the present invention, the $D_v90$ and $D_n90$ of the hard carbon particles may be no more than 8 μm and no more than 2.7 μm, respectively. When the $D_n90$ of the hard carbon particles is less than or equal to 2.7 μm, many number fractions of the hard carbon particles may be disposed in the pores between the graphite particles. Therefore, output characteristics, high-temperature storage efficiency, and lifespan characteristics of the lithium secondary battery may be improved without any decrease in energy density of an electrode.

The $D_v90$ represents a particle diameter when a cumulative volume from a small particle diameter accounts for 90% in measuring a particle size distribution using a laser scattering method, and the $D_n90$ represents a particle diameter when a cumulative particle number from a small particle diameter accounts for 90% in measuring a particle size distribution using a laser scattering method.

As can be seen from Examples as will be described below, when the $D_v90$ and $D_n90$ of the hard carbon particles mixed with the negative electrode active material included in the negative electrode of the lithium secondary battery according to one exemplary embodiment of the present invention satisfy these ranges, excellent output characteristics, high-temperature storage efficiency of the lithium secondary battery may be realized.

More specifically and illustratively, the $D_v90$ and $D_n90$ of the hard carbon particles may be less than or equal to 6 μm and less than or equal to 2 μm, respectively.

Also, the $D_v90$ may be greater than or equal to 4 μm, and the $D_n90$ may be greater than or equal to 1.2 μm, but the present invention is not limited thereto.

In the negative electrode active material included in the negative electrode of the lithium secondary battery according to one exemplary embodiment of the present invention, the $D_v10$ and $D_n10$ of the hard carbon particles may be less than or equal to 2 μm and less than or equal to 0.5 μm, respectively.

The $D_v10$ represents a particle diameter when a cumulative volume from a small particle diameter accounts for 10% in measuring a particle size distribution using a laser scattering method, and the $D_n10$ represents a particle diameter when a cumulative particle number from a small particle diameter accounts for 10% in measuring a particle size distribution using a laser scattering method.

As can be seen from Examples as will be described below, when the $D_v10$ and $D_n10$ of the hard carbon particles mixed with the negative electrode active material included in the negative electrode of the lithium secondary battery according to one exemplary embodiment of the present invention satisfy these ranges, excellent output characteristics, high-temperature storage efficiency of the lithium secondary battery may be realized.

More specifically and illustratively, the $D_v10$ and $D_n10$ of the hard carbon particles may be less than or equal to 1.5 μm and less than or equal to 0.3 μm, respectively.

Also, the $D_v10$ may be greater than or equal to 0.6 μm, and the $D_n10$ may be greater than or equal to 0.2 μm, but the present invention is not limited thereto.

In the negative electrode of the lithium secondary battery according to one exemplary embodiment of the present invention, a BET specific surface area of the negative electrode active material layer may be no less than 2 m²/g and no more than 3.5 m²/g.

The BET specific surface area may, for example, be measured in a pressure range ($P/P_0$) of 0.05 to 0.3 by a nitrogen gas adsorption BET method using an ASAP2020 apparatus (Micrometrics Instrument Corp.) after a specimen is taken according to the KS A 0094 and KS L ISO 18757 standards and degassed at 300° C. for 3 hours using a preprocessor.

The specific surface area of the negative electrode is similar to those of the negative electrodes in which hard carbon particles available in the art are mixed at a content of 20% by weight. For example, even when the hard carbon particles of the present invention satisfying the particle size distribution are added at a small amount of 5% by weight or less, the negative electrode of the lithium secondary battery according to one exemplary embodiment of the present invention may have a specific surface area similar to the negative electrodes in which common hard carbon is mixed at a content of 20% by weight.

That is, even when the hard carbon particles of the present invention satisfying the particle size distribution are added at a small amount, an effect of increasing a specific surface area of an electrode may be realized and a lithium adsorption/release capability may be improved without causing any damage to the graphite particles.

For the negative electrode of the lithium secondary battery according to one exemplary embodiment of the present invention, a total pore area in the negative electrode may be less than or equal to 3.0 m²/g, as measured by mercury intrusion porosimetry when the negative electrode is pressed at an electrode density of 1.6 g/cc. More specifically, the total pore area may be no less than 1.5 m²/g and no more than 2.9 m²/g, or no less than 1.5 m²/g and no more than 2.7 m²/g.

Also, the total pore area in the negative electrode may be less than or equal to 2.4 m²/g, as measured by mercury intrusion porosimetry when the negative electrode is pressed at an electrode density of 1.5 g/cc. More specifically, the total pore area may be no less than 1.2 m²/g and no more than 2.4 m²/g.

Further, the total pore area in the negative electrode may be less than or equal to 3.0 m²/g, as measured by mercury intrusion porosimetry when the negative electrode is pressed at an electrode density of 1.7 g/cc. More specifically, the total pore area may be no less than 2.0 m²/g and no more than 3.0 m²/g.

Here, the term "total pore area" may refer to a total surface area of pores in the negative electrode, as measured by mercury intrusion porosimetry. For example, the total pore area may be measured under the following conditions using an AutoPore V 9600 mercury intrusion porosimeter (Mercury Porosimetry Micromeritics).

Specimen

Specimen Weight: 1 g±0.1 g
Electrode Specimen Sampling: Number Corresponding to Weight of Specimen with Size of 1 cm×5 cm Measurement Medium Mercury Measurement Conditions Measured in Approximately 150 Points from 0.2 Psig to 33,000 Psig
Intervals upon Mercury Intrusion: 10 Seconds
Mercury Contact Angle Setup: 130° C.

Such a total pore area indicates that an increase in the total pore area caused by an increase in electrode density is small with respect to the negative electrodes prepared by mixing hard carbon available in the art.

An increase in the total pore area during pressing means causing damage (e.g., cracks, and the like) to the graphite particles caused by the mixed hard carbon. In this case, side reactions with an electrolyte solution may increase, and lifespan characteristics and high-temperature storage efficiency may be degraded.

In the lithium secondary battery according to one exemplary embodiment of the present invention, the electrode density of the negative electrode when the negative electrode is pressed at an electrode density of 1.6 g/cc is similar to this electrode density range. Therefore, an increase in the total pore area caused by an increase in the electrode density may be small with respect to the negative electrodes prepared by mixing hard carbon available in the art.

Therefore, the damage to the graphite particles serving as the main active material caused by the mixed hard carbon may be prevented, thereby reducing side reactions with an electrolyte solution and improving lifespan characteristics and high-temperature storage capacity efficiency.

Specifically, a rate of increase (A) in the total pore area of the negative electrode of the lithium secondary battery according to one exemplary embodiment of the present invention may be less than or equal to 3.4.

$$A=(V_a-V_b)/0.2$$

The rate of increase (A) in the total pore area is a rate of increase in the total pore area with respect to an increase in the electrode density when the electrode density of the negative electrode changes from 1.5 g/cc to 1.7 g/cc. In the A, $V_a$ represents a total pore area (m²/g) of the negative electrode measured at an electrode density of 1.7 g/cc by mercury intrusion porosimetry, $V_b$ represents a total pore area (m²/g) of the negative electrode measured at an electrode density of 1.5 g/cc by mercury intrusion porosimetry, and 0.2 is calculated from the equation: 1.7 g/cc−1.5 g/cc.

That is, in the negative electrode of the lithium secondary battery according to one exemplary embodiment of the present invention, an increase in the total pore area caused by an increase in the electrode density is small, indicating that the damage (e.g., cracks, and the like) to the graphite particles caused by the mixed hard carbon during pressing is prevented.

Because the negative electrode of the lithium secondary battery according to one exemplary embodiment of the present invention has a rate of increase (A) in the total pore area within this range, an increase in the total pore area of the negative electrode caused by an increase in the electrode density may be small with respect to the negative electrodes prepared by mixing hard carbon available in the art.

Therefore, the damage to the graphite particles caused by the mixed hard carbon may be prevented, thereby reducing side reactions with an electrolyte solution and improving lifespan characteristics and high-temperature storage capacity efficiency.

The lower limit of A may be 2.0, particularly 2.5, but the present invention is not particularly limited thereto.

The upper limit of A may be more specifically 3.2, but the present invention is not particularly limited thereto.

Hereinafter, other components other than the negative electrode active material in the negative electrode will be described. However, it should be understood that the description provided herein is given by way of example, but is not particularly intended to limit the present invention.

The negative electrode may be prepared by mixing a solvent, and, when necessary, a negative electrode binder, and a conductive material with a negative electrode active material, stirring the resulting mixture to prepare a slurry, coating a current collector with the slurry, compressing the current collector, and drying the current collector to form a negative electrode active material layer on the current collector. The negative electrode active material is as described above, and thus a description thereof is omitted.

Hereinafter, the current collector, the negative electrode binder, and the conductive material will be described in further detail. However, it should be understood that the description provided herein is not intended to limit the present invention.

The negative electrode binder serves to readily attach negative electrode active material particles to each other, and also serves to readily attach a negative electrode active material to a current collector. Water-insoluble binder, water-soluble binder, or a combination thereof may be used as the binder.

The water-insoluble binder may include polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, polyamide imide, polyimide, or a combination thereof.

The water-soluble binder may include a styrene-butadiene rubber, an acrylated styrene-butadiene rubber, polyvinyl alcohol, sodium polyacrylate, an olefin copolymer with propylene and 2 to 8 carbon atoms, a copolymer of (meth) acrylic acid and (meth)acrylic acid alkyl ester, or a combination thereof.

When a water-soluble binder is used as the negative electrode binder, the binder may further include a cellulose-based compound capable of giving viscosity. The cellulose-based compound may include carboxymethyl cellulose, hydroxypropylmethyl cellulose, methyl cellulose, or an alkali metal salt thereof, which may be used alone or in combination with one or more types thereof. Na, K, or Li may be used as the alkali metal.

The conductive material is used to give conductivity to an electrode. For the battery thus configured, any conductive materials may be used as long as they are materials that are electronically conductive without causing any chemical change. For example, conductive materials including a carbon-based material such as natural graphite, artificial graphite, carbon black, acetylene black, ketjen black, carbon fibers, carbon nanotubes, and the like; a metallic material such as a metal powder, for example, copper, nickel, aluminum, silver, and the like, metal fibers, or the like; a conductive polymer such as a polyphenylene derivative, or the like; or a mixture thereof may be used as the conductive material.

In addition, one selected from the group consisting of a copper film, a nickel film, a stainless steel film, a titanium film, a nickel foam, a copper foam, a polymer substrate coated with a conductive metal, or a combination thereof may be used as the current collector.

Hereinafter, configurations of other components other than the negative electrode in the lithium secondary battery according to one exemplary embodiment of the present invention will be described.

The lithium secondary battery may include the aforementioned negative electrode according to one exemplary embodiment of the present invention, a positive electrode, and an electrolyte, and may further include a separator between the positive electrode and the negative electrode.

The negative electrode is as described above, and thus the other components of the battery will be described below. However, it should be understood that the description provided herein is given by way of example, but is not intended to limit the present invention.

The positive electrode may include a current collector and a positive electrode active material layer disposed on the current collector. Al or Cu may be used as the current collector, but the present invention is not limited thereto.

A compound (a lithiated intercalation compound) enabling reversible intercalation or deintercalation of lithium ions may be used as the positive electrode active material. Specifically, one or more of complex oxides of lithium and metals selected from cobalt, manganese, nickel, and a combination thereof as known in the related art may, for example, be used as the lithium metal oxide. In this case, certain compositions of the lithium metal oxide are not particularly limited.

The positive electrode active material layer may further include a positive electrode binder and a conductive material.

The binder serves to readily attach positive electrode active material particles to each other, and also serves to readily attach a positive electrode active material to a current collector.

Polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like may be used as representative examples of the binder, but the present invention is not limited thereto.

The conductive material is used to give conductivity to an electrode. For the battery thus configured, any conductive materials may be used as long as they are materials that are electronically conductive without causing any chemical change. For example, metal powders such as natural graphite, artificial graphite, carbon black, acetylene black, ketjen black, carbon fibers, carbon nanotubes, copper, nickel, aluminum, silver, and the like; metal fibers, and the like may be used as the conductive material. Also, a conductive material such as a polyphenylene derivative, and the like may be used alone or in combination with one or more types thereof, but the present invention is not limited thereto.

The lithium secondary battery may be a non-aqueous electrolyte secondary battery. In this case, a non-aqueous electrolyte may include a non-aqueous organic solvent and a lithium salt.

The non-aqueous organic solvent may serve as a medium that enables the movement of ions involved in an electrochemical reaction of the battery.

Materials commonly used in the technical field of lithium secondary batteries may be used as the non-aqueous organic solvent and the lithium salt. In this case, certain materials are not limited thereto.

Also, as described above, a separator may also be present between the positive electrode and the negative electrode. Polyethylene, polypropylene, polyvinylidene fluoride, or a multilayered film of two or more types thereof may be used as the separator. Of course, a mixed multilayered film such as a polyethylene/polypropylene 2-layered separator, a polyethylene/polypropylene/polyethylene 3-layered separator, a polypropylene/polyethylene/polypropylene 3-layered separator, and the like may be used herein, but the present invention is not particularly limited thereto.

Hereinafter, preferred examples and comparative examples of the present invention will be described. It should be understood that the following examples are merely given as the preferred examples of the present invention, but are not intended to limit the present invention.

Preparation Examples

As summarized in the following Table 1, hard carbon particles of Preparation Example 1, and commercially available hard carbon particles of Preparation Example 2 were prepared as the low crystalline carbon-based particles having a Raman spectrum R value ($I_d/I_g$) of 0.9 or more.

TABLE 1

| Items | Type | Particle Size Distribution (μm) | | |
|---|---|---|---|---|
| | | D10 | D50 | D90 |
| Preparation Example 1 | Volume Density | 1.2 | 3.0 | 6.0 |
| | Number Density | 0.3 | 0.6 | 1.8 |
| Preparation Example 2 | Volume Density | 2.4 | 7.7 | 13 |
| | Number Density | 0.6 | 1.1 | 2.8 |

The particle size distributions of the hard carbon particles of Preparation Examples 1 and 2 were measured using Mastersizer 3000 (Malvern Instruments Ltd.) after a specimen of the hard carbon particles was taken according to the KS A ISO 13320-1 standard.

Specifically, a volume density and a number density of the hard carbon particles were measured after the hard carbon particles were dispersed using ethanol as a solvent, and using an ultrasonic disperser, when necessary.

EXAMPLES AND COMPARATIVE EXAMPLES

1. Preparation of Negative Electrode and Coin-Type Half Cell

The hard carbon particles of Preparation Example 1 or 2 were mixed with spherical natural graphite (a main active material) having an average particle diameter of 11 μm to prepare a negative electrode active material. Mixing ratios (by weight) of spherical natural graphite and hard carbon particles used in each of Examples and Comparative Examples are summarized in Table 2.

Next, the prepared negative electrode active material, a styrene butadiene rubber (SBR), and carboxymethyl cellulose (CMC) serving as a thickening agent were mixed at a mass ratio of 97.3:1.5:1.2, and the resulting mixture was then dispersed in ion-free distilled water to prepare a composition. Thereafter, one surface of a Cu-foil current collector was coated with the composition, and the Cu-foil current collector was dried and rolled to form a negative electrode active material layer having a size of 10 cm×10 cm×50 μm. As a result, a negative electrode having an electrode density of 1.60±0.05 g/cm$^3$ and a loading amount of 8 mg/cm$^2$ was prepared.

Lithium metal films were used as the negative electrode thus prepared and a counter electrode. And, the negative electrode and counter electrode were impregnated into an electrolyte solution in which 1 M LiPF$_6$ was dissolved in a mixed solvent of ethylene carbonate (EC)/ethyl methyl carbonate (EMC)/diethylene carbonate (DEC) (at a volume ratio of 25:45:30), with a separator (polyethylene having a thickness of 25 μm) interposed between the negative electrode and the counter electrode, to prepare a 2016-type coin cell.

2. Preparation of Negative Electrode and Full Cell

A negative electrode was prepared in the same manner as in "Preparation of Half Cell," except that a solution obtained by mixing spherical natural graphite having an average particle diameter of 11 μm and artificial graphite having an average particle diameter of 13 μm at a weight ratio of 5:5 was used as the main active material.

Li$_{1.0}$Ni$_{0.6}$Co$_{0.2}$Mn$_{0.2}$O$_2$, Denka Black, and PVDF were used as the positive electrode active material, the conductive material, and the binder, respectively, and N-methyl pyrrolidone was used as the solvent. In this case, the respective components were mixed with a mass ratio composition of 46:2.5:1.5:50 to prepare a positive electrode mixture. Thereafter, an aluminum substrate was coated with the positive electrode mixture, dried, and pressed to prepare a positive electrode.

The prepared positive and negative electrodes were separately notched with a proper size, and stacked, and a separator (polyethylene having a thickness of 25 μm) was interposed between a positive electrode plate and a negative electrode plate to constitute a battery. Thereafter, a tap region of the positive electrode and a tap region of the negative electrode were separately welded.

The welded positive electrode/separator/negative electrode assembly was put into a pouch, and three sides other than a side of electrolyte solution immersion portion (including a tapped region in a sealing region) were sealed. An electrolyte solution was immersed into the other region, and the other side was sealed, and the assembly was then impregnated for 12 hours or more. The electrolyte solution was a mixed solvent of ethylene carbonate (EC)/ethyl methyl carbonate (EMC)/diethylene carbonate (DEC) (at a volume ratio of 25:45:30). In this case, a solution obtained by preparing a 1 M LiPF$_6$ solution and adding 1% by weight of vinylene carbonate (VC), 0.5% by weight of 1,3-propenesultone (PRS), and 0.5% by weight of lithium bis(oxalato) borate (LiBOB) to the solution was used as the electrolyte solution.

Next, the electrolyte solution was pre-charged for 36 minutes at a current (2.5 A) corresponding to 0.25 C. After an hour, the electrolyte solution was degassed, aged for 24 hours, and then subjected to formation charging and discharging (charging conditions: CC-CV 0.2 C 4.2 V 0.05 C CUT-OFF, and discharging conditions: CC 0.2 C 2.5 V CUT-OFF).

Then, the standard charging and discharging were performed (charging conditions: CC-CV 0.5 C 4.2 V 0.05 C CUT-OFF, and discharging conditions: CC 0.5 C 2.5 V CUT-OFF).

TABLE 2

| Items | Negative Electrode Active Material Compositions (% represents % by weight) | | |
|---|---|---|---|
| | Hard Carbon Types | Mixing Ratio of Main Active Material | Mixing Ratio of Hard Carbon |
| Example 1 | Preparation Example 1 | 99% | 1% |
| Example 2 | Preparation Example 1 | 98% | 2% |
| Example 3 | Preparation Example 1 | 97% | 3% |
| Example 4 | Preparation Example 1 | 96% | 4% |
| Example 5 | Preparation Example 1 | 95% | 5% |
| Comparative Example 1 | Preparation Example 2 | 97% | 3% |
| Comparative Example 2 | Preparation Example 2 | 80% | 20% |

FIG. 1 is a scanning electron microscope (SEM) image obtained by observing a section of the negative electrode prepared in Example 3. It can be seen that the hard carbon particles of the present invention satisfying the particle size distribution were disposed on the pores between the natural graphite particles, and the natural graphite was not damaged.

Figure 2:
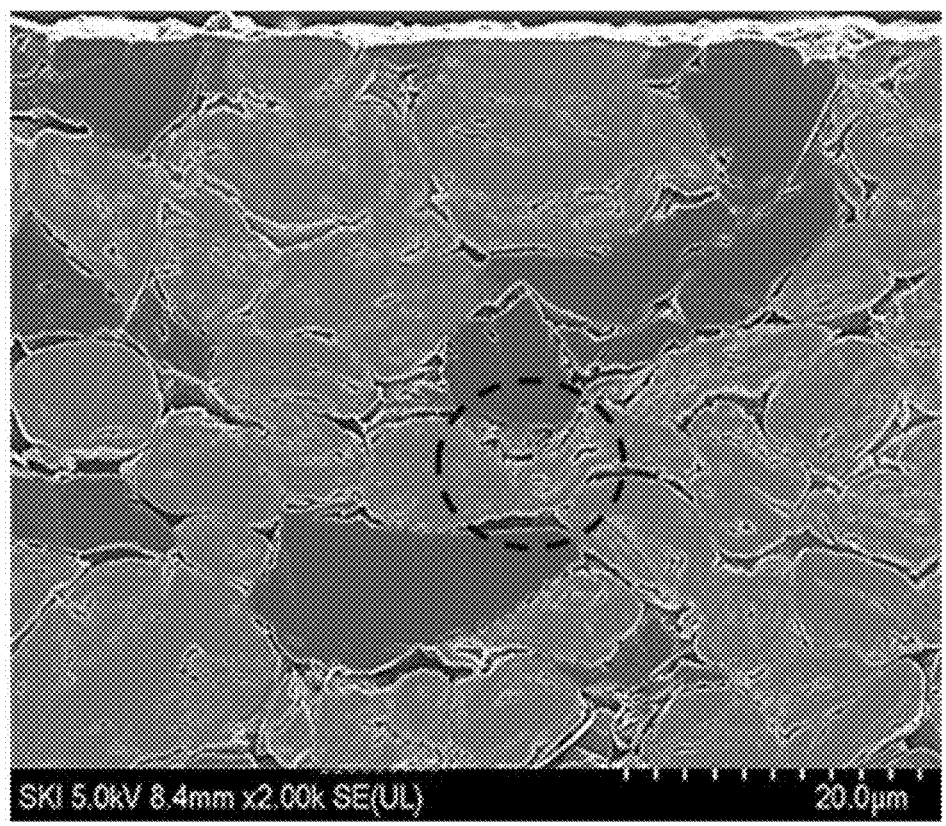
FIG. 2 is a scanning electron microscope image obtained by observing a section of a negative electrode prepared in Comparative Example 2.

FIG. 2 is a scanning electron microscope image obtained by observing a section of the negative electrode prepared in Comparative Example 2. It can be seen that natural graphite was damaged due to the large size of hard carbon.

Experimental Example 1

Certain sections of the negative electrodes prepared during preparation of the full cells of Example 5 and Comparative Example 2 were photographed using a scanning electron microscope, and the Raman spectra of the same sections were measured. Based on these results, a ratio of a diameter of the hard carbon particles to a diameter of the graphite particles in the negative electrode active material layer, and an area of the hard carbon particles having a long diameter of 8 μm or less in the sections of the negative electrode active material layer were measured.

Specifically, the Raman spectrum measurement was performed by cutting the negative electrode active material layer of the negative electrode using an ion miller, processing sections of the negative electrode active material layer, and subjecting the sections to Raman analysis at longitudinal and vertical intervals of 200 nm from three optionally selected points having an area of 80 μm×20 μm using a Raman analyzer (Nanophoton, RAMANforce). In this case, a laser wavelength, a laser output, and a laser exposure time of a Raman spectrometer were set to 532.06 nm, 11.87 mW, and 20 seconds, respectively.

A region in which the hard carbon was present was able to be confirmed from the points having a Raman spectrum R value (a ratio $I_d/I_g$ of an intensity ($I_d$) of a D band and an intensity ($I_g$) of a G band in the measured Raman spectrum) of 0.9 or more.

FIG. 3 shows a scanning electron microscope image and a Raman image of the negative electrode prepared in Example 5 as measured in this way.

Next, a ratio of a diameter of the hard carbon particles to a diameter of the graphite particles (i.e., a diameter of hard carbon particles/a diameter of graphite particles) in the sections the negative electrode active material layer, and an area of the hard carbon particles having a long diameter of 8 μm or less in the sections were measured using the following methods.

The ratio of a diameter of hard carbon particles to a diameter of graphite particles was calculated using the largest one of long diameters of the graphite particles confirmed and measured with the naked eye from the scanning electron microscope image as the diameter of the graphite particles and using the largest one of long diameters of the hard carbon particles confirmed by the Raman spectrum as the diameter of the hard carbon particles.

In the area of hard carbon particles having a long diameter of 8 μm or less in the sections of a negative electrode active material layer, an area of a portion of the hard carbon particles having a long diameter of 8 μm or less in a portion of the hard carbon particles having a Raman spectrum R value of 0.9 or more was calculated from the total area of the sections of the negative electrode active material layer in the Raman image.

From the analysis results, in the case of the negative electrode prepared in Example 5, the ratio of the diameter of the hard carbon particles to the diameter of the graphite particles was less than or equal to ½, and the area of the hard carbon particles having a long diameter of 8 μm or less in the sections of the negative electrode active material layer was less than or equal to 8%.

Meanwhile, in the case of the negative electrode prepared in Comparative Example 2, the ratio of the diameter of the hard carbon particles to the diameter of the graphite particles was greater than ½, and the area of the hard carbon particles having a long diameter of 8 μm or less in the sections of the negative electrode active material layer exceeded 8%.

Experimental Example 2

The negative electrodes prepared during preparation of the full cells of Examples 1 to 3 and Comparative Examples 1 and 2 were measured by differential scanning calorimetry (851e Model from Mettler Toledo Ltd.). The control (Ref.) represents a case in which 100% by weight of spherical natural graphite having an average particle diameter of 11 μm or less was used as the negative electrode active material without any addition of hard carbon.

Specifically, the measurement was performed by heating 6 mg of a specimen of the negative electrode active material layer prepared in each of Examples to 600° C. at a rate of 5° C./min while feeding air to the specimen at a rate of 50 mL/min.

The results are summarized in FIG. 4.

From the measurement results, the negative electrodes prepared in Examples 1 to 3 showed an apex of an exothermic peak in a temperature range of no less than 370° C. and no more than 390° C., and the negative electrodes of Examples 2 and 3 in which hard carbon particles were mixed at a content of 2% by weight or more also showed an apex of an exothermic peak in a temperature range of no less than 450° C. and no more than 510° C. On the other hand, the negative electrodes prepared in Comparative Examples 1 and 2 did not show an apex of an exothermic peak in a temperature range of no less than 370° C. and no more than 390° C.

Also, in the case of the negative electrodes prepared in Examples 1 to 3, a heating value of the exothermic peak having an apex at a temperature of no less than 370° C. and no more than 390° C. was no less than 50 J/g and no more than 200 J/g, and a heating value of the exothermic peak having an apex at a temperature of no less than 450° C. and no more than 510° C. was no less than 20 J/g and no more than 60 J/g.

On the other hand, the negative electrode prepared in Comparative Example 2 did not satisfy this peak heating value.

Experimental Example 3

Negative electrodes were prepared according to the following measurement methods in the same manner as in Examples 3 and 5 and Comparative Examples 1 and 2, except that the varying electrode densities were used. Thereafter, the total pore areas of the prepared negative electrodes were measured by mercury intrusion porosimetry. The results are summarized in Table 3.

Measurement Method

Measuring Machine: using AutoPore V 9600 mercury intrusion porosimeter (Mercury Porosimetry Micromeritics).

Specimen

Specimen Weight: 1 g±0.1 g
Electrode Specimen Sampling: Number Corresponding to Weight of Specimen with Size of 1 cm×5 cm Measurement Medium Mercury Measurement Conditions Measured in Approximately 150 Points from 0.2 Psig to 33,000 Psig
Intervals upon Mercury Intrusion: 10 Seconds
Mercury Contact Angle Setup: 130° C.

TABLE 3

| Items | Total Pore Area ($m^2/g$) | | | | Rate of Increase (A) in Total Pore Area |
|---|---|---|---|---|---|
| | Before Pressing | 1.5 g/cc | 1.6 g/cc | 1.7 g/cc | |
| Example 3 | 1.203 | 2.204 | 2.651 | 2.748 | 2.72 |
| Example 5 | 1.34 | 2.22 | 2.68 | 2.854 | 3.17 |
| Comparative Example 1 | 1.41 | 2.727 | 2.935 | 3.422 | 3.48 |
| Comparative Example 2 | 1.62 | 2.932 | 3.642 | 4.2 | 6.34 |

$A=(V_a-V_b)/0.2$ (wherein $V_a$ represents a total pore area ($m^2/g$) of the negative electrode measured at an electrode density of 1.7 g/cc by mercury intrusion porosimetry, $V_b$ represents a total pore area ($m^2/g$) of the negative electrode measured at an electrode density of 1.5 g/cc by mercury intrusion porosimetry, and 0.2 is calculated from the equation: 1.7 g/cc−1.5 g/cc).

It was confirmed that the negative electrodes prepared in Examples 3 and 5 had a small total pore area at the same electrode density, compared to the negative electrodes of Comparative Examples, and an increase in the total pore area caused by an increase in electrode density was small. From these results, it can be seen that the damage to the graphite particles serving as the main active material caused by the mixed hard carbon was prevented, indicating that side reactions with an electrolyte solution were reduced and lifespan characteristics and a high-temperature storage capacity retention rate were improved.

Experimental Example 4

BET specific surface areas of the negative electrodes prepared in Examples 1, 2, 3, and 5 and Comparative Example 2 were measured. The results are summarized in Table 4.

The BET specific surface area was measured, as follows.

A specimen was taken according to the KS A 0094 and KS L ISO 18757 standards, and degassed at 300° C. for 3 hours using a preprocessor, and a specific surface area of the specimen was measured in a pressure range ($P/P_0$) of 0.05 to 0.3 by a nitrogen gas adsorption BET method using an ASAP2020 apparatus (Micrometrics Instrument Corp.).

TABLE 4

| | BET Specific Surface Area ($m^2/g$) of Negative Electrode Active Material Layer |
|---|---|
| Example 1 | 2.877 |
| Example 2 | 2.954 |
| Example 3 | 3.031 |
| Example 5 | 3.185 |
| Comparative Example 2 | 2.98 |

As listed in Table 4, even when the hard carbon particles of Preparation Example 1 satisfying the particle size distribution were added at a small amount of 5% by weight or less, the negative electrodes had similar specific surface areas, compared to when 20% by weight of common hard carbon was mixed. That is, it was confirmed that, even when the hard carbon particles of the present invention satisfying the particle size distribution were added at a small amount, an effect of increasing a specific surface area of the electrode was realized and a lithium adsorption/release capability was improved without causing any damage to the natural graphite.

Experimental Example 5

Capacity retention rates of the half cells prepared in Examples 1 and 3 and Comparative Example 1 according to the constant rate thereof were measured. The results are summarized in the following Table 5.

In Table 5, the control (Ref.) represents a case in which 100% by weight of spherical natural graphite having an average particle diameter of 11 μm or less was used as the negative electrode active material without any addition of hard carbon.

TABLE 5

| Items | Discharge Capacity (mAh/g) According to C-Rate | | | | | | |
|---|---|---|---|---|---|---|---|
| | 0.1 C | 0.2 C | 1 C | 2 C | 3 C | 4 C | 5 C |
| Example 1 | 355.8 | 354.7 | 346.7 | 258.9 | 201.7 | 171.5 | — |
| Example 3 | 362.3 | 361.5 | 358.7 | 315.2 | 283.6 | 257 | 210.9 |
| Comparative Example 1 | 355.2 | 354.3 | 329.4 | 243.5 | — | — | — |
| Ref. | 354 | 353.3 | 327.3 | 237.2 | — | — | — |

As listed in Table 5, it was confirmed that the capacities were not reduced in the case of the half cells of Examples 1 and 3 in which the hard carbon particles of Preparation Example 1 satisfying the particle size distribution were mixed.

Also, the half cell of Comparative Example 1 in which 3% by weight of the hard carbon particles of Preparation Example 2 were mixed was not able to be charged and discharged at a high rate.

On the other hand, it was confirmed that the half cells of Examples 1 and 3 were chargeable and dischargeable at a rate of 3 C or more, and thus were chargeable and dischargeable at a high temperature. The half cell of Example 3 showed a relatively high capacity retention rate even at a high rate of 5 C.

Experimental Example 6

The full cells prepared in Examples 3 and 5 and Comparative Example 1 were kept for 12 weeks in the air at 60° C. under a full state of charge (SoC) of 100%, and taken out every week to perform a residual discharge. Thereafter, the full cells were charged and discharged to measure capacities and direct current internal resistances (DC-IRs). Then, the high-temperature storage performance was evaluated by comparing the capacity retention rates and the rates of increase in the DC-IR with those before being kept at 60° C. The results are summarized in Tables 6 and 7.

The charging/discharging conditions used to determine the capacities before and after being kept were as follows.

At 25° C., charging conditions: CC-CV 0.5 C 4.2 V 0.05 C CUT-OFF, and discharging conditions: CC 0.5 C 2.5 V CUT-OFF.

TABLE 6

| | Initial Capacity (Ah) | Capacity Retention Rate (%) After Being Kept |
|---|---|---|
| Example 3 | 20.4 | 80.8 |
| Example 5 | 20.1 | 79 |
| Comparative Example 1 | 20.1 | 63.4 |

As listed in Table 6, the full cells of Examples 3 and 5 had no reduced capacity and showed excellent high-temperature storage efficiency.

TABLE 7

| | Rate of Increase (%) in DC-IR at SOC of 50% After Being Kept at 60° C. for 12 Weeks |
|---|---|
| Example 3 | 10.7 |
| Example 5 | 11.0 |
| Comparative Example 1 | 46.1 |

As listed in Table 7, it can be seen that, even when the full cells of Examples 3 and 5 were kept at 60° C. for 12 weeks, the rates of increase in DC-IRs of the full cells were lower than that of Comparative Example 1.

The discharge DC-IR was measured based on the discharge capacity measured after a full cell was kept at a high temperature, followed by finishing capacity measurements. The measurement method was as follows.

Discharge direct current internal resistance (DC-IR) measurement: The discharge DC-IR may be calculated from the formula: $(V_0-V_1)/I_{dis}$, and a full cell is charged to a state of charge (SOC) of 50% at room temperature and a rate of 0.5 C, and rest for 30 minutes. In this case, a voltage ($V_0$) is measured. A voltage ($V_1$) when a full cell is discharged with a current ($I_{dis}$) of 1 C for 10 seconds is measured.

Experimental Example 7

The full cells prepared in Examples 3 and 5 and Comparative Example 1 were repeatedly charged and discharged at 25° C. under the following condition for 600 cycles, and the capacity retention rates with respect to the initial capacities were calculated. The results are summarized in Table 8.

The full cell was charged with a current at a rate of 0.5 C by applying a constant current to the full cell until a battery voltage of the full cell reached 4.2 V, and then charged by maintaining the constant voltage when the battery voltage reached 4.2 V and cutting off the current when the current density reached a rate of 0.05 C. Then, the full cell was discharged at a constant current at a rate of 0.5 C until the voltage reached 2.5V. This cycle was repeated 600 times.

TABLE 8

| | Initial Capacity (Ah) | Capacity Retention Rate (%) after 600 Cycles |
|---|---|---|
| Example 3 | 20.4 | 93 |
| Example 5 | 20.1 | 92.2 |
| Comparative Example 1 | 20.1 | 90.7 |

As listed in Table 8, it can be seen that the room-temperature lifespan characteristics of the full cells of Examples 3 and 5 were very excellent, and were improved compared to that of Comparative Example 1.

The lithium secondary battery according to one exemplary embodiment of the present invention can be rapidly charged and discharged because lithium ions can be rapidly adsorbed and released to/from the negative electrode, may have excellent high-temperature storage efficiency because the capacity of the lithium secondary battery is slightly degraded even when kept at a high temperature of 60° C., and may have excellent lifespan characteristics because the capacity of the lithium secondary battery is slightly degraded even when repeatedly charged and discharged. Therefore, it is expected that the lithium secondary battery of the present invention can be chosen as a lithium secondary battery for electric vehicles, thereby significantly advancing a time for commercialization of electric vehicles.

Also, the lithium secondary battery according to one exemplary embodiment of the present invention can have further improved lifespan characteristics because the lithium secondary battery has an excellent ability to adsorb and release lithium ions, and also shows a few side reactions with an electrolyte solution of the negative electrode.

The lithium secondary battery according to one exemplary embodiment of the present invention can have excellent battery output characteristics such as charge and discharge outputs, and rapid charging and discharging.

Further, the lithium secondary battery according to one exemplary embodiment of the present invention can have excellent lifespan and high-temperature storage characteristics.

What is claimed is:

1. A lithium secondary battery comprising:
a negative electrode comprising a negative electrode active material layer,
wherein the negative electrode active material layer comprises a mixed negative electrode active material including graphite particles and low crystalline carbon-based particles, and
the negative electrode active material layer has an apex of an exothermic peak in a temperature range of no less than 450° C. and no more than 510° C., as measured by differential scanning calorimetry (DSC),
wherein a heating value of the exothermic peak having an apex at a temperature of no less than 450° C. and no more than 510° C. is no less than 20 J/g and no more than 60 J/g,
wherein the differential scanning calorimetry measurement is performed by heating 6 mg of a specimen of the negative electrode active material layer to 600° C. at a rate of 5° C./min while feeding air to the specimen at a rate of 50 mL/min, and
wherein the low crystalline carbon-based particles have a Raman spectrum R value (Id/Ig) of 0.9 or more.

2. The lithium secondary battery of claim 1, wherein the negative electrode active material layer further has an apex of an exothermic peak in a temperature range of no less than 370° C. and no more than 390° C., as measured by differential scanning calorimetry (DSC),
wherein a heating value of the exothermic peak having an apex at a temperature of no less than 370° C. and no more than 390° C. is no less than 50 J/g and no more than 200 J/g.

3. The lithium secondary battery of claim 1, wherein the low crystalline carbon-based particles are capable of adsorbing and releasing Li ions.

4. The lithium secondary battery of claim 1, wherein the low crystalline carbon-based particles have a discharge capacity of 240 mAh/g or more for the second cycle when a negative electrode active material is used as the low crystalline carbon-based particles and a lithium metal is used as a counter electrode, and
wherein the discharge capacity is a discharge capacity determined under charging/discharging conditions at which, after charging is performed with a constant current at a rate of 0.1 C, the charging is stopped when a current flows at a rate of 0.01 C in a constant voltage mode until a constant voltage reaches 0.005 V, and discharging to 1.5V is performed with a constant current at a rate of 0.1 C with a rest interval of 10 minutes.

5. The lithium secondary battery of claim 1, wherein the low crystalline carbon-based particles are hard carbon particles.

6. The lithium secondary battery of claim 1, wherein the low crystalline carbon-based particles have a $D_v50$ of 4 μm or less and a $D_n50$ of 1 μm or less, and
wherein the $D_v50$ represents a particle diameter when a cumulative volume from a small particle diameter accounts for 50% in measuring a particle size distribution using a laser scattering method, and the $D_n50$ represents a particle diameter when a cumulative particle number from a small particle diameter accounts for 50% in measuring a particle size distribution using a laser scattering method.

7. The lithium secondary battery of claim 1, wherein the low crystalline carbon-based particles have a $D_v10$ of 2 μm or less and a $D_n10$ of 0.5 μm or less, and
wherein the $D_v10$ represents a particle diameter when a cumulative volume from a small particle diameter accounts for 10% in measuring a particle size distribution using a laser scattering method, and the $D_n10$ represents a particle diameter when a cumulative particle number from a small particle diameter accounts for 10% in measuring a particle size distribution using a laser scattering method.

8. The lithium secondary battery of claim 1, wherein the low crystalline carbon-based particles have a $D_v90$ of 8 μm or less and a $D_n90$ of 2.7 μm or less, and
wherein the $D_v90$ represents a particle diameter when a cumulative volume from a small particle diameter accounts for 90% in measuring a particle size distribution using a laser scattering method, and the $D_n90$ represents a particle diameter when a cumulative particle number from a small particle diameter accounts for 90% in measuring a particle size distribution using a laser scattering method.

9. The lithium secondary battery of claim 1, wherein the mixed negative electrode active material comprises 5% by weight or less of the low crystalline carbon-based particles, based on a total of 100% by weight of the mixed negative electrode active material.

10. The lithium secondary battery of claim 1, wherein the negative electrode has a total pore area of 3.0 m²/g or less, as measured by mercury intrusion porosimetry when the negative electrode is pressed at an electrode density of 1.6 g/cc.

11. The lithium secondary battery of claim 1, wherein a rate of increase (A) in the total pore area of the negative electrode is less than or equal to 3.4:

$$A=(V_a-V_b)/0.2$$

wherein $V_a$ represents a total pore area (m²/g) of the negative electrode measured at an electrode density of 1.7 g/cc by mercury intrusion porosimetry, $V_b$ represents a total pore area (m²/g) of the negative electrode measured at an electrode density of 1.5 g/cc by mercury intrusion porosimetry, and 0.2 is calculated from the equation: 1.7 g/cc−1.5 g/cc.

12. A lithium secondary battery comprising:
a negative electrode comprising a negative electrode active material layer,
wherein the negative electrode active material layer comprises a mixed negative electrode active material including graphite particles and low crystalline carbon-based particles, and
in the three or more points having an area of 80 μm×20 μm optionally selected from sections of the negative electrode active material layer, a ratio of a diameter of the low crystalline carbon-based particles to a diameter of the graphite particles is less than or equal to ½, and
wherein the diameter of the graphite particles and the diameter of the low crystalline carbon-based particles are the highest value selected from the long diameters of the graphite particles and the highest value selected from the long diameters of the low crystalline carbon-based particles, respectively, in the optionally selected points having an area of 80 μm×20 μm, and wherein the low crystalline carbon-based particles have a Raman spectrum R value (Id/Ig) of 0.9 or more.

13. The lithium secondary battery of claim 12, wherein, in the three or more points having an area of 80 μm×20 μm optionally selected from sections of the negative electrode active material layer, the area of the low crystalline carbon-based particles having a long diameter of 8 μm or less accounts for no less than 0.5% and no more than 8% with respect to the total area of the sections.

* * * * *